(12) United States Patent  
Schwarz et al.

(10) Patent No.: US 9,910,586 B2  
(45) Date of Patent: Mar. 6, 2018

(54) APPARATUS, METHOD, AND PROGRAM PRODUCT FOR DETECTING INPUT GESTURES

(71) Applicant: LENOVO (Singapore) PTE. LTD., New Tech Park (SG)

(72) Inventors: David Alexander Schwarz, Morrisville, NC (US); Scott Edwards Kelso, Cary, NC (US); John Weldon Nicholson, Cary, NC (US); Matthew Price Roper, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 56 days.

(21) Appl. No.: 15/059,590

(22) Filed: Mar. 3, 2016

(65) Prior Publication Data

US 2017/0255379 A1 Sep. 7, 2017

(51) Int. Cl.  
*G06F 3/0488* (2013.01)  
*G06T 11/20* (2006.01)

(52) U.S. Cl.  
CPC ........ *G06F 3/04883* (2013.01); *G06T 11/203* (2013.01)

(58) Field of Classification Search  
None  
See application file for complete search history.

(56) References Cited

U.S. PATENT DOCUMENTS

| 2011/0113329 A1* | 5/2011 | Pusateri | G06F 3/04883 715/702 |
| 2016/0124568 A1* | 5/2016 | Heim | G06F 3/04883 345/174 |

\* cited by examiner

*Primary Examiner* — Duane N Taylor, Jr.  
(74) *Attorney, Agent, or Firm* — Kunzler, PC

(57) ABSTRACT

Apparatuses, methods, and program products are disclosed for detecting input gestures. In one method, an input is detected by use of a processor. Moreover, the method may include determining a centric position of the input. A vertical axis and a horizontal axis of a virtual coordinate plane may extend through the centric position of the input such that an origin of the virtual coordinate plane is positioned within the centric position of the input. The method may also include determining that the input includes a circular gesture if the input intersects at least a positive point on a first axis extending through the origin, a negative point on the first axis, a positive point on a second axis extending through the origin, and a negative point on the second axis.

20 Claims, 7 Drawing Sheets

APPARATUS, METHOD, AND PROGRAM PRODUCT FOR DETECTING INPUT GESTURES

FIELD

The subject matter disclosed herein relates to input gestures and more particularly relates to detecting input gestures.

BACKGROUND

Description of the Related Art

Information handling devices, such as desktop computers, laptop computers, tablet computers, smart phones, optical head-mounted display units, smart watches, etc., are ubiquitous in society. Input gestures may be used to provide input to these information handling devices. Determining what input gestures are input may be time consuming and may use many resources of an information handling device.

BRIEF SUMMARY

An apparatus for detecting input gestures is disclosed. A method and computer program product also perform the functions of the apparatus. In one embodiment, the apparatus includes an input device, a processor, and a memory that stores code executable by the processor. The code, in various embodiments, is executable by the processor to detect an input to the input device. In a further embodiment, the code is executable by the processor to determine a centric position of the input. A vertical axis and a horizontal axis of a virtual coordinate plane extend through the centric position of the input such that an origin of the virtual coordinate plane is positioned within the centric position of the input. The code, in some embodiments, is executable by the processor to determine that the input includes a circular gesture if the input intersects at least a positive point on a first axis extending through the origin, a negative point on the first axis, a positive point on a second axis extending through the origin, and a negative point on the second axis.

In some embodiments, the code executable by the processor to determine the centric position of the input further includes code executable by the processor to determine a centroid of the input. In one embodiment, the memory further includes code executable by the processor to determine whether the input intersects at least the positive point on the first axis, the negative point on the first axis, the positive point on the second axis, and the negative point on the second axis.

In another embodiment, the memory further includes code executable by the processor to determine multiple data points positioned on the virtual coordinate plane. Each data point of the multiple data points corresponds to a respective input data sample of the input. In such an embodiment, the code executable by the processor to determine whether the input intersects at least the positive point on the first axis, the negative point on the first axis, the positive point on the second axis, and the negative point on the second axis includes code executable by the processor to determine whether a line segment formed by connecting two data points of the plurality of data points passes through at least one of the first axis and the second axis. Moreover, the two data points may correspond to two consecutive input data samples of the input.

In certain embodiments, the code executable by the processor to determine whether the input intersects at least the positive point on the first axis, the negative point on the first axis, the positive point on the second axis, and the negative point on the second axis includes code executable by the processor to determine whether the input intersects the positive point on the first axis, the negative point on the first axis, the positive point on the second axis, and the negative point on the second axis at least a predetermined distance from the origin.

In one embodiment, the memory further includes code executable by the processor to down-sample input data samples of the input to produce a reduced number of input data samples. Moreover, in various embodiments, the memory further includes code executable by the processor to determine multiple data points positioned on the virtual coordinate plane. Each data point of the multiple data points corresponds to a respective input data sample of the reduced number of input data samples.

A method for detecting input gestures, in one embodiment, includes detecting, by use of a processor, an input. In some embodiments, the method includes determining a centric position of the input. A vertical axis and a horizontal axis of a virtual coordinate plane may extend through the centric position of the input such that an origin of the virtual coordinate plane is positioned within the centric position of the input. In a further embodiment, the method includes determining that the input includes a circular gesture if the input intersects at least a positive point on a first axis extending through the origin, a negative point on the first axis, a positive point on a second axis extending through the origin, and a negative point on the second axis.

In some embodiments, detecting the input includes detecting a written gesture input. In various embodiments, determining the centric position of the input includes determining a centroid of the input. In one embodiment, the method includes determining whether the input intersects at least the positive point on the first axis, the negative point on the first axis, the positive point on the second axis, and the negative point on the second axis.

In some embodiments, the method includes determining multiple data points positioned on the virtual coordinate plane. Each data point of the multiple data points may correspond to a respective input data sample of the input. In such embodiments, determining whether the input intersects at least the positive point on the first axis, the negative point on the first axis, the positive point on the second axis, and the negative point on the second axis includes determining whether a line segment formed by connecting two data points of the plurality of data points passes through at least one of the first axis and the second axis. The two data points may correspond to two consecutive input data samples of the input.

In certain embodiments, the method may include down-sampling input data samples of the input to produce a reduced number of input data samples. In various embodiments, the method may also include determining multiple data points on the virtual coordinate plane. Each data point of the multiple data points may correspond to a respective input data sample of the reduced number of input data samples.

In one embodiment, a program product includes a computer readable storage medium that stores code executable by a processor. The executable code, in certain embodiments, includes code to perform detecting an input. In a further embodiment, the executable code includes code to perform determining a centric position of the input. A vertical axis and a horizontal axis of a virtual coordinate plane may extend through the centric position of the input such that an origin of the virtual coordinate plane is positioned within the centric position of the input. The executable code, in some embodiments, includes code to perform determining that the input includes a circular gesture if the input intersects at least a positive point on a first axis extending through the origin, a negative point on the first axis, a positive point on a second axis extending through the origin, and a negative point on the second axis.

In certain embodiments, the code further includes code to perform determining whether the input intersects at least the positive point on the first axis, the negative point on the first axis, the positive point on the second axis, and the negative point on the second axis. In some embodiments, the code further includes code to perform determining multiple data points positioned on the virtual coordinate plane. Each data point of the multiple data points may correspond to a respective input data sample of the input. In further embodiments, the code to perform determining whether the input intersects at least the positive point on the first axis, the negative point on the first axis, the positive point on the second axis, and the negative point on the second axis further includes code to perform determining whether a line segment formed by connecting two data points of the plurality of data points passes through at least one of the first axis and the second axis. The two data points may correspond to two consecutive input data samples of the input.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
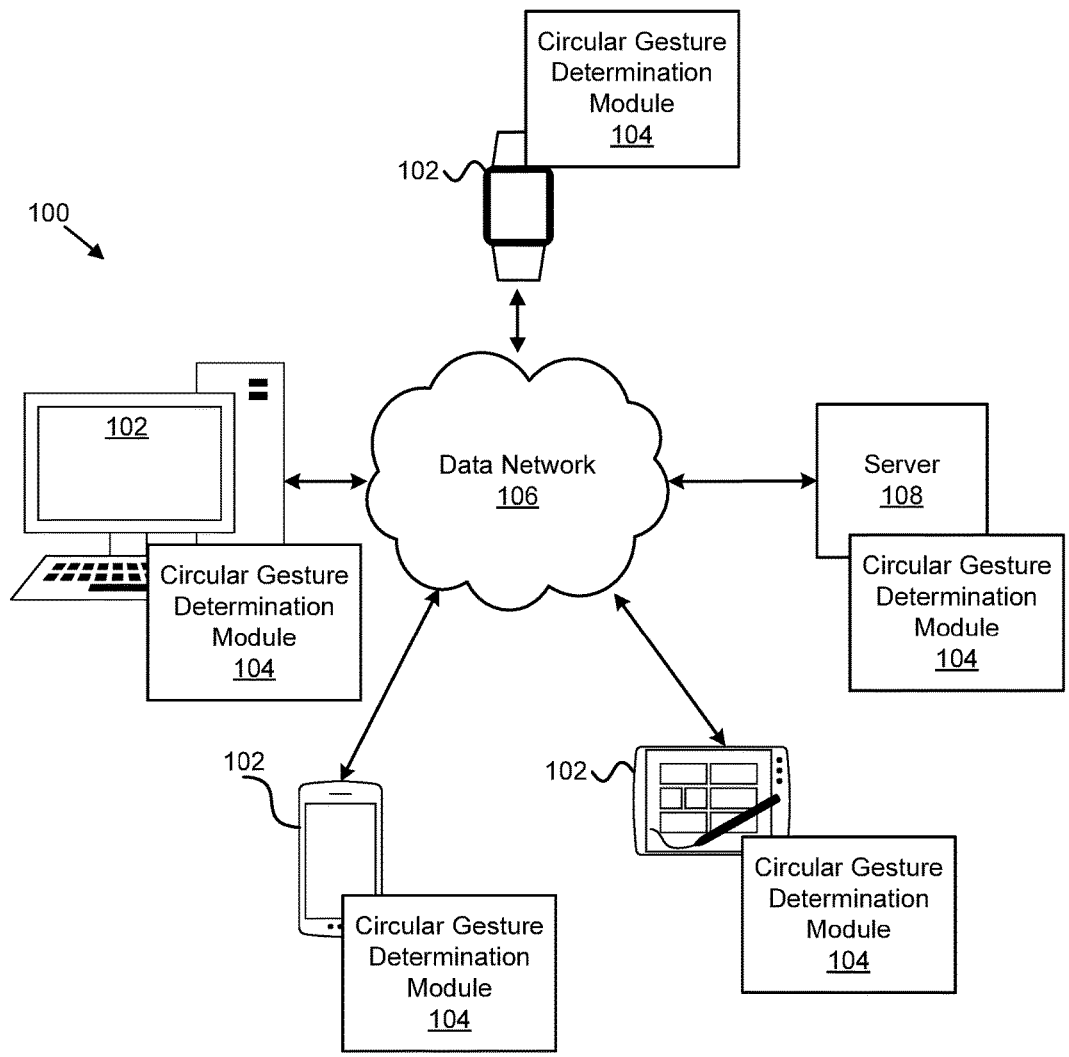
FIG. 1 is a schematic block diagram illustrating one embodiment of a system for detecting input gestures.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for detecting input gestures. In one embodiment, the system 100 includes information handling devices 102, circular gesture determination modules 104, data networks 106, and servers 108. Even though a specific number of information handling devices 102, circular gesture determination modules 104, data networks 106, and servers 108 are depicted in FIG. 1, one of skill in the art will recognize that any number of information handling devices 102, circular gesture determination modules 104, data networks 106, and servers 108 may be included in the system 100.

In one embodiment, the information handling devices 102 include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the information handling devices 102 include wearable devices, such as smart watches, fitness bands, optical head-mounted displays, or the like. The information handling devices 102 may access the data network 106 directly using a network connection.

The information handling devices 102 and/or the servers 108 may include an embodiment of the circular gesture determination module 104. In certain embodiments, the circular gesture determination module 104 may detect an input. The circular gesture determination module 104 may determine a centric position of the input. Moreover, a vertical axis and a horizontal axis of a virtual coordinate plane may extend through the centric position of the input such that an origin of the virtual coordinate plane is positioned within the centric position of the input. The circular gesture determination module 104 may also determine that the input includes a circular gesture if the input intersects at least a positive point on a first axis extending through the origin, a negative point on the first axis, a positive point on a second axis extending through the origin, and a negative point on the second axis. In this manner, the circular gesture determination module 104 may be used to detect when an input includes a circular gesture. Using this technique, the circular gesture may be detected faster, more accurately, and with fewer computer resources (e.g., memory, processor, time, etc.) than other techniques.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

In one embodiment, the servers 108 include computing devices, such as desktop computers, laptop computers, mainframe computers, cloud servers, virtual servers, and/or the like. In some embodiments, the servers 108 are designed as application servers, email servers, database servers, file servers, game servers, home servers, media servers, web servers, and/or the like. In certain embodiments, the servers 108 store data, and may be designed to be accessed by one or more information handling devices 102 through the network 106. In certain embodiments, the servers 108 may include at least a portion of the circular gesture determination module 104 and may perform one or more operations of the circular gesture determination module 104.

Figure 2:
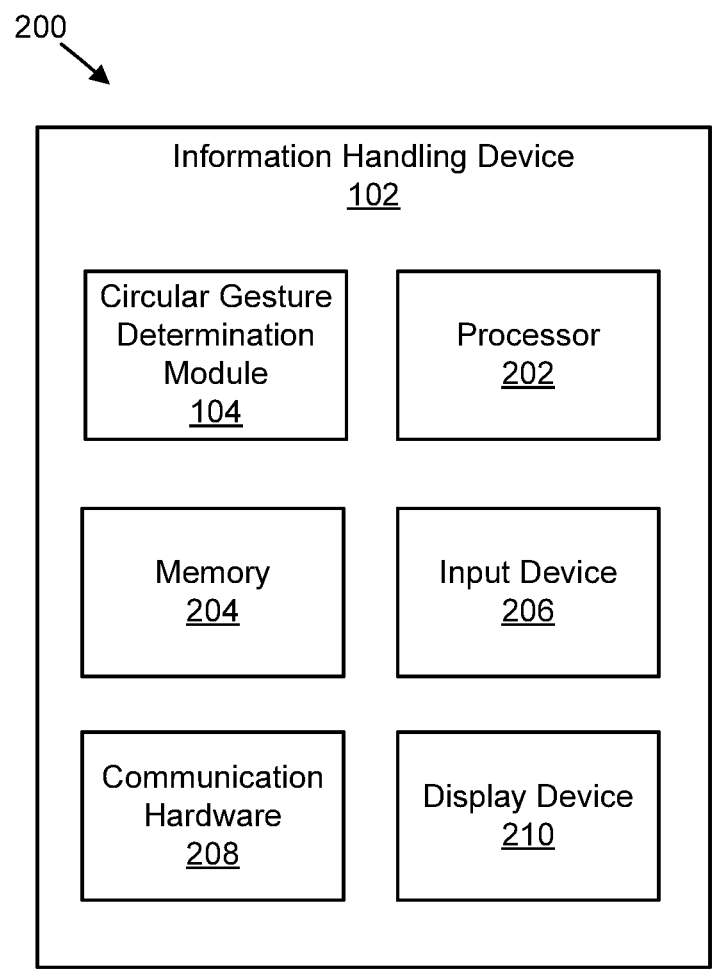
FIG. 2 is a schematic block diagram illustrating one embodiment of an apparatus including an information handling device.

FIG. 2 depicts one embodiment of an apparatus 200 that may be used for detecting input gestures. The apparatus 200 includes one embodiment of the information handling device 102. Furthermore, the information handling device 102 may include the circular gesture determination module 104, a processor 202, a memory 204, an input device 206, communication hardware 208, and a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the circular gesture determination module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to gesture determination. In some embodiments, the memory 204 also stores program code and related data, such as an operating system or other controller algorithms operating on the information handling device 102.

The information handling device 102 may use the circular gesture determination module 104 for detecting a circular gesture. As may be appreciated, the circular gesture determination module 104 may include computer hardware, computer software, or a combination of both computer hardware and computer software. For example, the circular gesture determination module 104 may include circuitry, or a processor, used to detect an input. As another example, the circular gesture determination module 104 may include computer program code that determines that the input includes a circular gesture.

The input device 206, in one embodiment, may include any known computer input device including a touch panel, a button, a keyboard, a stylus, or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like.

Further, the display device 210 may be a component of a smart phone, a personal digital assistant, a television, a table computer, a notebook (laptop) computer, a personal computer, a vehicle dashboard, or the like.

In certain embodiments, the display device 210 includes one or more speakers for producing sound. For example, the display device 210 may produce an audible alert or notification (e.g., a beep or chime) upon detecting a circular gesture. In some embodiments, the display device 210 includes one or more haptic devices for producing vibrations, motion, or other haptic feedback. For example, the display device 210 may produce haptic feedback upon initiating data limitation.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the circular gesture determination module 104.

Figure 3:
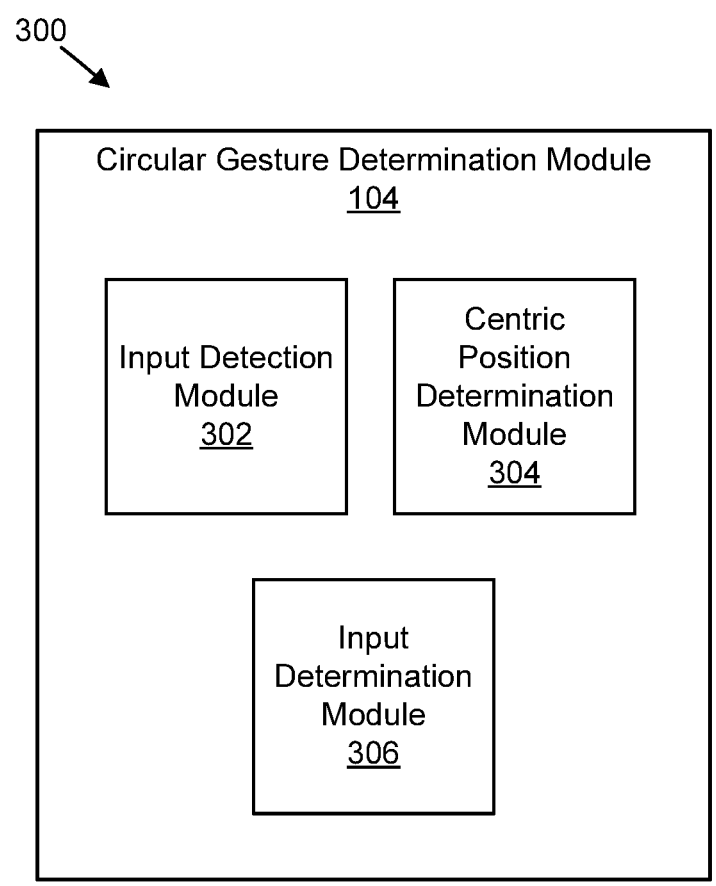
FIG. 3 is a schematic block diagram illustrating one embodiment of an apparatus including a circular gesture determination module.

FIG. 3 depicts a schematic block diagram illustrating one embodiment of an apparatus 300 that includes one embodiment of the circular gesture determination module 104. Furthermore, the circular gesture determination module 104 includes an input detection module 302, a centric position determination module 304, and an input determination module 306.

The input detection module 302 may be used to detect an input. The input may be provided to an input device, such as a touchscreen, or another computer input. Moreover, the input may be provided to an information handling device 102 using any suitable device or method. For example, the input may be provided using a finger, a stylus, a mouse, a pen, an input device, and so forth. As another example, the input may be provided via inertial motion data, such as using movement of the information handling device 102.

In some embodiments, the centric position determination module 304 may be used to determine a centric position of the input. In certain embodiments, a centric position may mean a position anywhere within the input. Moreover, a vertical axis and a horizontal axis of a virtual coordinate plane may extend through the centric position of the input such that an origin of the virtual coordinate plane is positioned within the centric position of the input.

In one example of operations performed by the centric position determination module 304, the centric position determination module 304 may receive the input. The input may be a written gesture input having a certain shape. As may be appreciated, a written gesture input may be any suitable written input provided to an information handing device 102. In certain embodiments, the input may be an inertial motion input made by moving the information handling device 102. After the input is detected by the input detection module 302, the centric position determination module 304 may determine a centric position of the shape of the input. In one embodiment, the centric position determination module 304 may determine a centroid of the shape of the input. It should be noted that the centroid of the shape of the input may be approximately a center of mass of a geometric object of uniform density. Put another way, the centroid of the shape of the input may be approximately an average position of all points of the shape. In another embodiment, the centric position of the shape of the input may be a position determined to be approximately the center of the shape using any suitable method.

Moreover, the operations performed by the centric position determination module 304 may include positioning an origin of a virtual coordinate plane (e.g., virtual Cartesian plane) within the centric position. Accordingly, the centric position may become the origin of the virtual coordinate plane such that a horizontal axis (e.g., x-axis, horizontal number line) and a vertical axis (e.g., y-axis, vertical number line) of the virtual coordinate plane intersect the centric position. As may be appreciated, the origin of the virtual coordinate plane is where the horizontal axis and the vertical axis intersect. With the centric position being the origin, portions of the horizontal axis and/or the vertical axis may intersect with the shape of the input.

In one embodiment, the input determination module 306 may determine that the input includes a circular gesture if the input intersects at least a positive point on a first axis extending through the origin, a negative point on the first axis, a positive point on a second axis extending through the origin, and a negative point on the second axis. For example, if the shape of the input intersects a positive point on the vertical axis (e.g., a point on the vertical axis above the origin), a negative point on the vertical axis (e.g., a point on the vertical axis below the origin), a positive point on the horizontal axis (e.g., a point on the horizontal axis to the right of the origin), and a negative point on the horizontal axis (e.g., a point on the horizontal axis to the left of the origin) then the input determination module 306 may determine that the input is a circular gesture. As may be appreciated, the horizontal axis and the vertical axis are examples of the first and second axis. Moreover, the first and second axis may be any suitable axis that extends through the origin.

In some embodiments, an angle between the first and second axis may be 10, 25, 30, 45, 60, 75, or 90 degrees. In other embodiments, an angle between the first and second axis may be any suitable angle. In addition, the first and second axis may be aligned with horizontal and/or vertical axis of the information handling device 102, or the first and second axis may not be aligned with horizontal and/or vertical axis of the information handling device 102. In various embodiments, there may be more than two axis used so that a circular gesture is detected only if three, four, five, six, or more axis are intersected by the input at two or more points (e.g., positive and negative relative to the origin). In one embodiment, there may be two or more axis used such that a circular gesture is detected if each axis is intersected by the input at only one point.

In some embodiments, an intersection of the first and second axis is valid for determining that a circular gesture was input only if the intersection point is at least a predetermined distance (e.g., threshold distance) from the origin. For example, in one embodiment, the predetermined distance may be at least 10% of a maximum distance of the input from the origin. In another embodiment, the predetermined distance may be at least 10% of a normalized maximum distance of the input from the origin.

Figure 4:
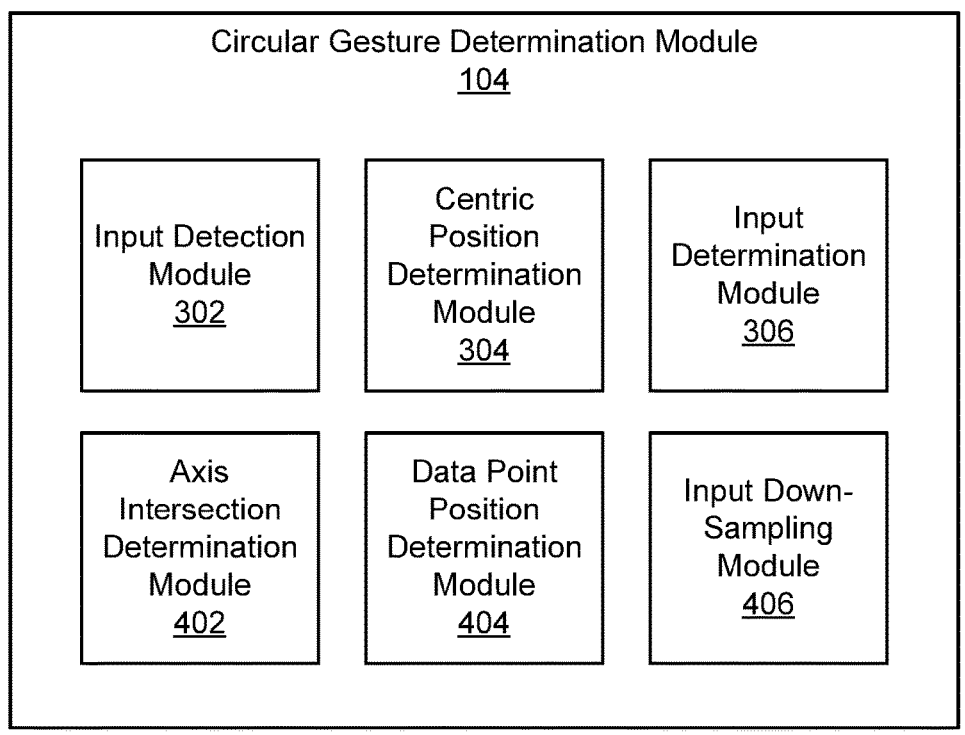
FIG. 4 is a schematic block diagram illustrating another embodiment of an apparatus including a circular gesture determination module.

FIG. 4 is a schematic block diagram illustrating another embodiment of an apparatus 400 that includes one embodiment of the circular gesture determination module 104. Furthermore, the circular gesture determination module 104 includes one embodiment of the input detection module 302, the centric position determination module 304, and the input determination module 306, that may be substantially similar to the input detection module 302, the centric position determination module 304, and the input determination module 306 described in relation to FIG. 3. The circular gesture determination module 104 also includes an axis intersection determination module 402, a data point position determination module 404, and an input down-sampling module 406.

In various embodiments, the axis intersection determination module 402 determines whether the input intersects at least a positive point on a first axis extending through the origin, a negative point on the first axis, a positive point on a second axis extending through the origin, and a negative point on the second axis. In some embodiments, the axis intersection determination module 402 determines whether a line segment formed by connecting two data points (of data points determined based on the input) passes through at least one of the first axis and the second axis. In such an embodiment, the two data points may correspond to two consecutive input data samples of the input. In certain embodiments, the two data points may correspond to two data points on either side of an intermediary data point. In such an embodiment, the intermediary data point may actually be located on one of the first axis and the second axis.

Moreover, the axis intersection determination module 402 may check all line segments formed by connecting data points from each pair of input data samples to determine whether each respective line segment intersects with the first axis and/or the second axis. The axis intersection determination module 402 may also determine whether each respective line segment intersects a positive point and/or a negative point on the first axis and/or the second axis. In certain embodiments, the axis intersection determination module 402 may store an indication for a line segment intersecting each of a positive point on the first axis, a negative point on the first axis, a positive point on the second axis, and a negative point on the second axis. In one embodiment, after one line segment intersects each of a positive point on the first axis, a negative point on the first axis, a positive point on the second axis, and a negative point on the second axis, the axis intersection determination module 402 may stop checking line segments.

For example, the first two data points corresponding to the first two consecutive input data samples of the input may be data points A and B. The data points A and B when connected by a line segment may form a line segment AB. Moreover, the axis intersection determination module 402 may determine whether line segment AB intersects any of a positive point on the first axis, a negative point on the first axis, a positive point on the second axis, and a negative point on the second axis. The axis intersection determination module 402 may note which, if any, of a positive point on the first axis, a negative point on the first axis, a positive point on the second axis, and a negative point on the second axis that the line segment AB intersects.

Then, the axis intersection determination module 402 may determine whether line segment BC (corresponding to data points B and C that represent the second and third data samples of the input) intersects any of a positive point on the first axis, a negative point on the first axis, a positive point on the second axis, and a negative point on the second axis. The axis intersection determination module 402 may note which, if any, of a positive point on the first axis, a negative point on the first axis, a positive point on the second axis, and a negative point on the second axis that the line segment BC intersects. This may repeat through either all of the data points, or until all of a positive point on the first axis, a negative point on the first axis, a positive point on the second axis, and a negative point on the second axis have been intersected.

In some embodiments, an intersection of the first and second axis is valid for determining that a circular gesture was input only if the intersection point is at least a predetermined distance (e.g., threshold distance) from the origin. For example, in one embodiment, the predetermined distance may be at least 10% of a maximum distance of the input from the origin. In another embodiment, the predetermined distance may be at least 10% of a normalized maximum distance of the input from the origin.

In certain embodiments, the data point position determination module 404 determines how data points are positioned on the virtual coordinate plane. Each data point corresponds to a respective input data sample of the input. In one embodiment, after the centric position determination module 304 determines the centric position of the input and positions the centric position at the origin of the virtual coordinate plane, the data point position determination module 404 may determine a location on the virtual coordinate plane for each data sample of the input with respect to the centric position of the input. For example, in one embodiment, the input may include 2000 data samples. The coordinates on the virtual coordinate plane for each data sample are determined with respect to the centric position. As may be appreciated, the coordinates for one data sample are one data point.

In some embodiments, the input down-sampling module 406 down-samples input data samples of the input to produce a reduced number of input data samples. In certain embodiments in which the input data samples are down-sampled to produce a reduced number of input data samples, the data point position determination module 404 may determine data points positioned on the virtual coordinate plane that correspond to a respective input data sample of the reduced number of input data samples.

For example, an original input may include 2000 data samples. The input down-sampling module 406 may down-sample the input data samples of the input to produce a reduced number of input data samples (e.g., 200 data samples). Accordingly, the data point position determination module 404 may only determine data points for the reduced number of input data samples (e.g., 200 data samples), thereby reducing an amount of processing used for determining data points and reducing an amount of processing used for determining whether line segments intersect the first axis and/or the second axis because of a fewer possible number of line segments.

Figure 5A:
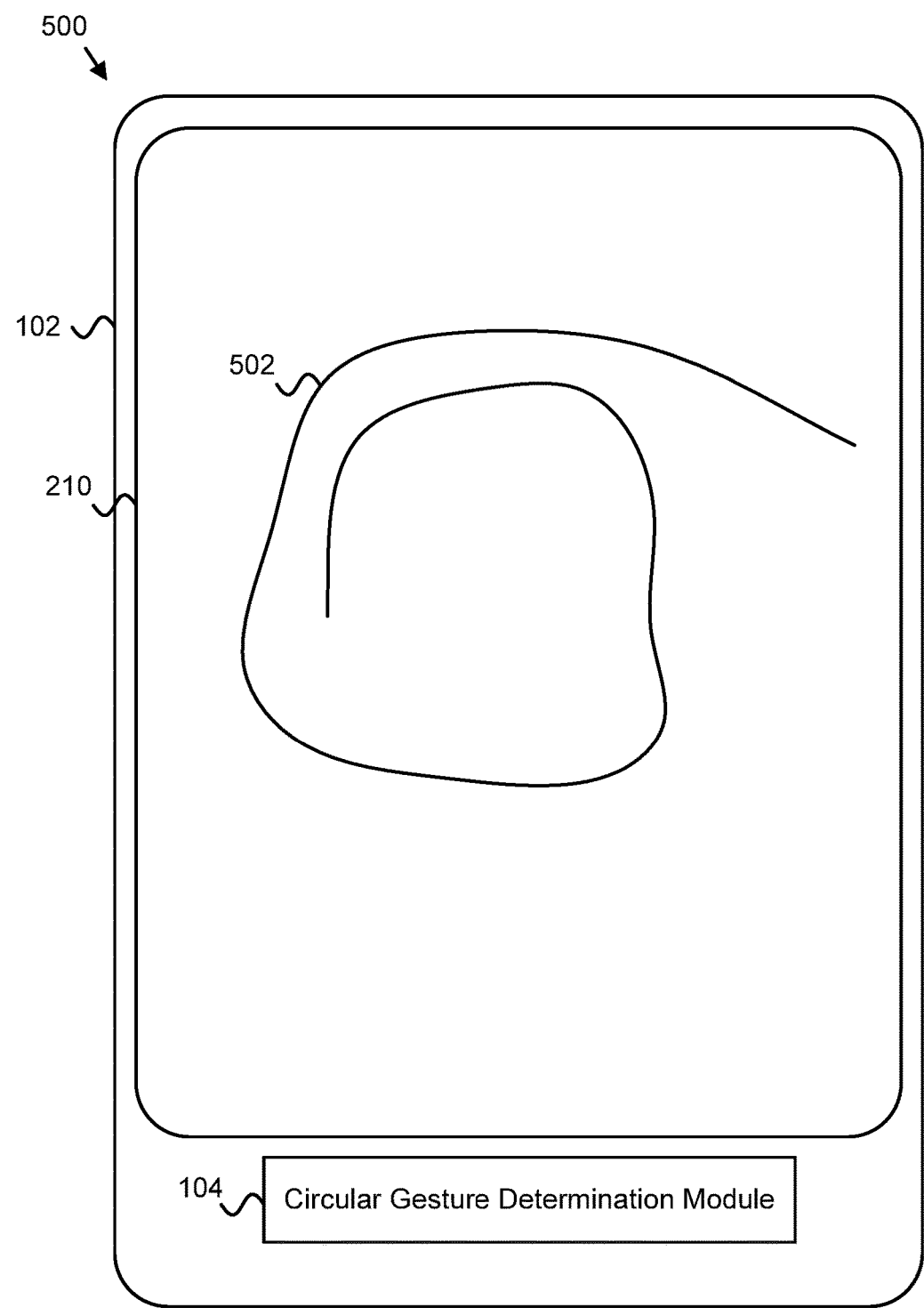
FIG. 5A is a schematic block diagram illustrating a further embodiment of an apparatus including a circular gesture determination module.

FIG. 5A is a schematic block diagram illustrating a further embodiment of an apparatus 500 that includes one embodiment of the circular gesture determination module 104. The apparatus 500 includes an information handling device 102 having a display device 210. The display device 210 may include a touchscreen on which input may be input by touching the surface of the display device 210. However, in certain embodiments, the display device 210 may not be a touchscreen, and input may be input via a device, such as a mouse or another input device. An input 502 is illustrated on the display device 210. The input 502 may be detected by the input detection module 302. As described previously, and as described in FIG. 5B, the circular gesture determination module 104 may be used to determine whether the input 502 is a circular gesture.

Figure 5B:
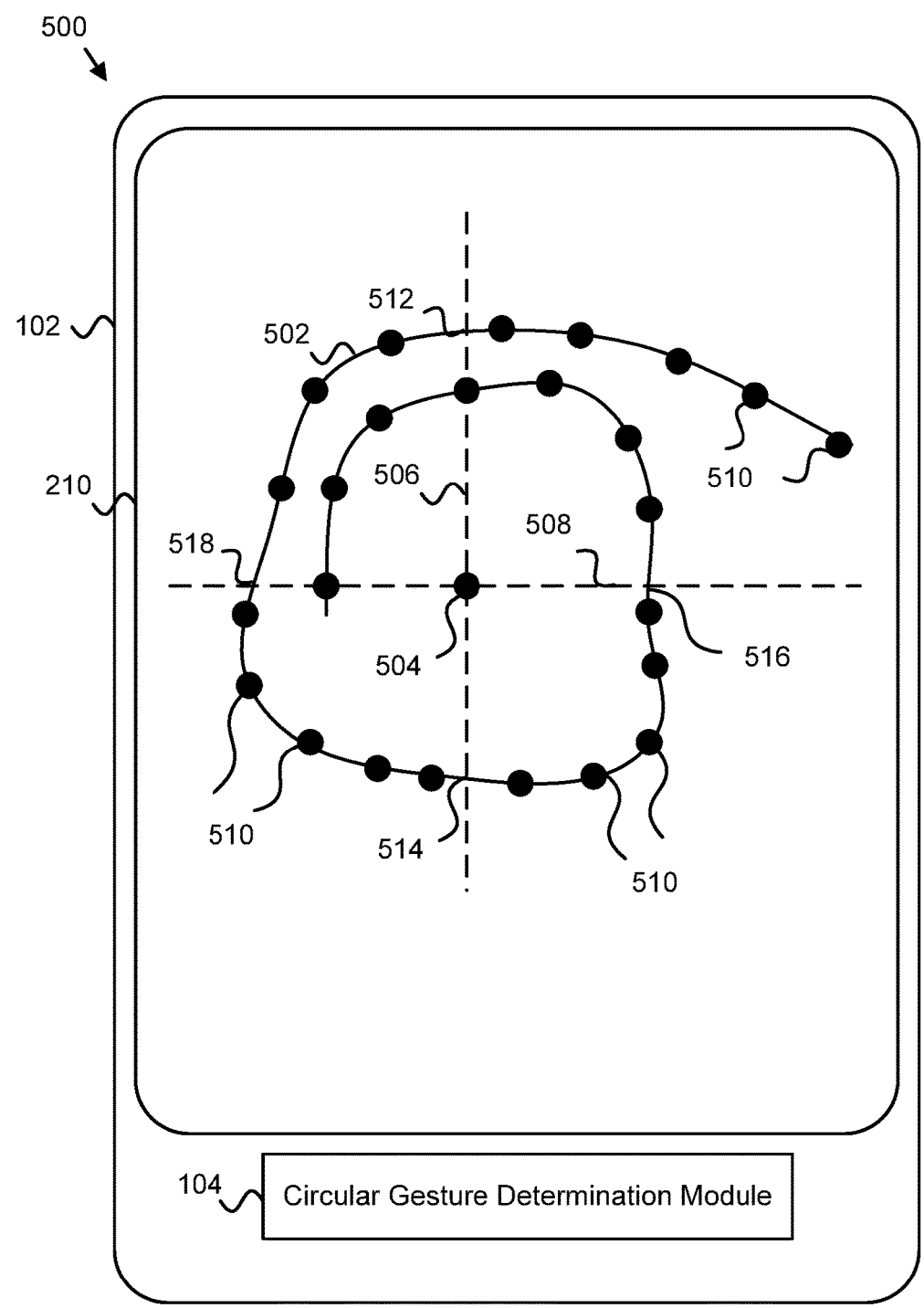
FIG. 5B is a schematic block diagram illustrating yet another embodiment of an apparatus including a circular gesture determination module.

FIG. 5B is a schematic block diagram illustrating yet another embodiment of the apparatus 500 that includes one embodiment of the circular gesture determination module 104. As may be appreciated, the elements illustrated on FIG. 5B that differ from FIG. 5A are illustrated for discussion purposes only and may not actually be displayed on the display device 210. As described previously, the centric position determination module 304 may determine a centric position 504 of the input 502. The centric position 504 is the position where a vertical axis 506 and a horizontal axis 508 of a virtual coordinate plane intersect.

The data point position determination module 404 may determine coordinates of input data samples to result in data points 510. Any number of data points 510 may be determined and may depend on the input sample rate corresponding to the input 502 and/or on down-sampling. However, for illustration purposes only 25 data points 510 are illustrated. The input determination module 306 may determine whether the input 502 intersects a positive point on the vertical axis 506, a negative point on the vertical axis 506, a positive point on the horizontal axis 508, and a negative point on the horizontal axis 508. As illustrated, the input 502 intersects a positive point 512 on the vertical axis 506, a negative point 514 on the vertical axis 506, a positive point 516 on the horizontal axis 508, and a negative point 518 on the horizontal axis 508. Accordingly, the input determination module 306 may determine that the input 502 is a circular gesture.

Figure 6:
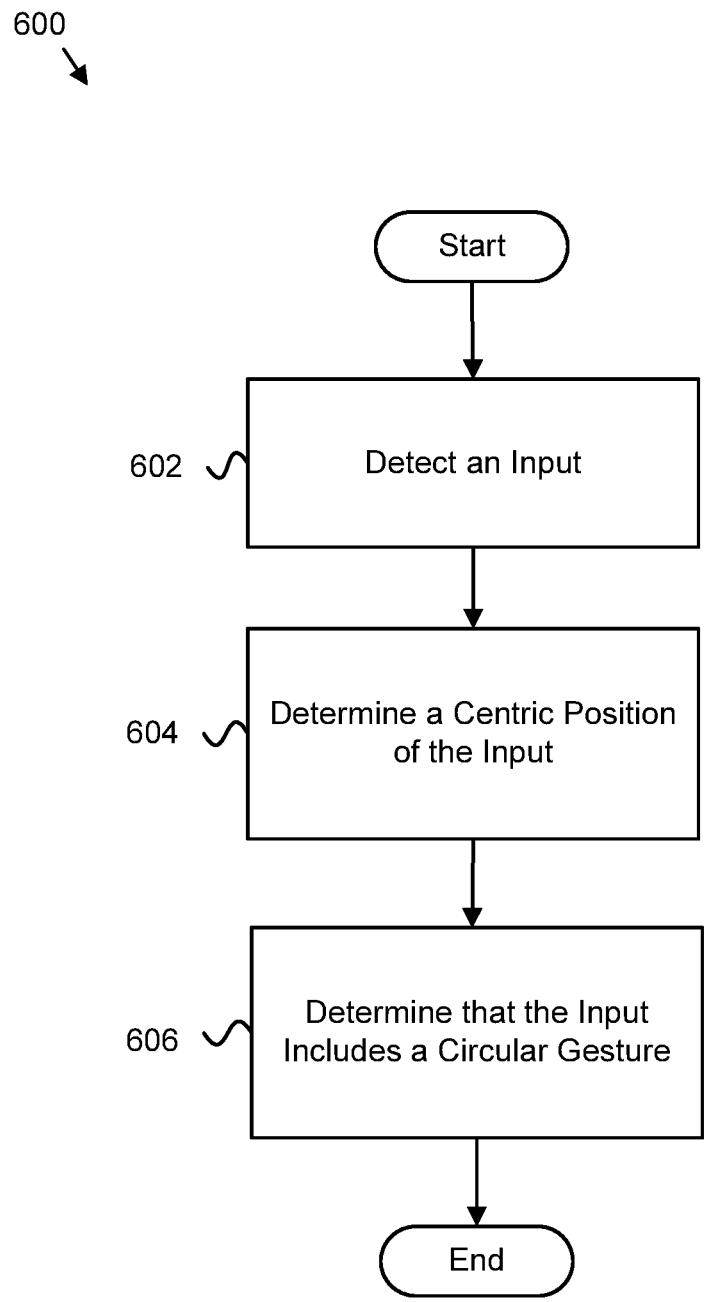
FIG. 6 is a schematic flow chart diagram illustrating an embodiment of a method for detecting input gestures.

FIG. 6 is a schematic flow chart diagram illustrating an embodiment of a method 600 for detecting input gestures. In some embodiments, the method 600 is performed by an apparatus, such as the information handling device 102. In other embodiments, the method 600 may be performed by a module, such as the circular gesture determination module 104. In certain embodiments, the method 600 may be performed by a processor executing program code, for example, a microcontroller, a microprocessor, a CPU, a GPU, an auxiliary processing unit, a FPGA, or the like.

The method 600 may include detecting 602 an input. In certain embodiments, the input detection module 302 may detect 602 the input. In some embodiments, detecting 602 the input may include detecting a written gesture input.

The method 600 may also include determining 604 a centric position of the input. Moreover, a vertical axis and a horizontal axis of a virtual coordinate plane may extend through the centric position of the input such that an origin of the virtual coordinate plane is positioned within the centric position of the input. In certain embodiments, the centric position determination module 304 may determine 604 the centric position of the input. In one embodiment, determining 604 the centric position of the input includes determining a centroid of the input.

The method 600 may determine 606 that the input includes a circular gesture if the input intersects at least a positive point on a first axis extending through the origin, a negative point on the first axis, a positive point on a second axis extending through the origin, and a negative point on the second axis, and the method 600 may end. In one embodiment, the input determination module 306 may determine 606 that the input includes the circular gesture if the input intersects at least a positive point on the first axis, a negative point on the first axis, a positive point on the second axis, and a negative point on the second axis.

In some embodiments, the method 600 may include determining whether the input intersects at least the positive point on the first axis, the negative point on the first axis, the positive point on the second axis, and the negative point on the second axis. Moreover, in various embodiments, the method 600 may include determining multiple data points positioned on the virtual coordinate plane. Each data point may correspond to a respective input data sample of the input. In such embodiments, determining whether the input intersects at least the positive point on the first axis, the negative point on the first axis, the positive point on the second axis, and the negative point on the second axis may include determining whether a line segment formed by connecting two data points of the plurality of data points passes through at least one of the first axis and the second axis. The two data points may correspond to two consecutive input data samples of the input, or the two data points may correspond to two input data samples on either side of a third data sample. In some embodiments, the method 600 may include down-sampling input data samples of the input to produce a reduced number of input data samples and analyzing only the reduced number of input data samples.

As may be appreciated, multiple types of circular gestures may be detected using the method 600. For example, the following gestures may be detected as circular gestures using the method 600: a spiral that does not intersect with itself, a spiral that is roughly angled, and a spiral that ends in the opposite side from where it starts. Although examples included herein refer to detecting circular gestures, the concepts described herein may be applied to detecting any suitable type of input gesture. Moreover, circular gestures may include lasso gestures, gestures made using a circular motion, and so forth.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an input device;
   a processor;
   a memory that stores code executable by the processor to:
      detect an input to the input device;
      determine a centric position of the input, wherein a vertical axis and a horizontal axis of a virtual coordinate plane extend through the centric position of the input such that an origin of the virtual coordinate plane is positioned within the centric position of the input; and
      determine that the input is a circular gesture, wherein determining that the input is a circular gesture consists essentially of determining that the input intersects:
         a positive point on a first axis extending through the origin;
         a negative point on the first axis;
         a positive point on a second axis extending through the origin; and
         a negative point on the second axis.

2. The apparatus of claim 1, wherein the code executable by the processor to determine the centric position of the input further comprises code executable by the processor to determine a centroid of the input.

3. The apparatus of claim 1, wherein the memory further comprises code executable by the processor to determine whether the input intersects at least the positive point on the first axis, the negative point on the first axis, the positive point on the second axis, and the negative point on the second axis.

4. The apparatus of claim 3, wherein the memory further comprises code executable by the processor to determine a plurality of data points positioned on the virtual coordinate plane, wherein each data point of the plurality of data points corresponds to a respective input data sample of the input.

5. The apparatus of claim 4, wherein the code executable by the processor to determine whether the input intersects at least the positive point on the first axis, the negative point on the first axis, the positive point on the second axis, and the negative point on the second axis comprises code executable by the processor to determine whether a line segment formed by connecting two data points of the plurality of data points passes through at least one of the first axis and the second axis, wherein the two data points correspond to two consecutive input data samples of the input.

6. The apparatus of claim 3, wherein the code executable by the processor to determine whether the input intersects at least the positive point on the first axis, the negative point on the first axis, the positive point on the second axis, and the negative point on the second axis comprises code executable by the processor to determine whether the input intersects the positive point on the first axis, the negative point on the first axis, the positive point on the second axis, and the negative point on the second axis at least a predetermined distance from the origin.

7. The apparatus of claim 3, wherein the memory further comprises code executable by the processor to down-sample input data samples of the input to produce a reduced number of input data samples.

8. The apparatus of claim 7, wherein the memory further comprises code executable by the processor to determine a plurality of data points positioned on the virtual coordinate plane, wherein each data point of the plurality of data points corresponds to a respective input data sample of the reduced number of input data samples.

9. A method comprising:
detecting, by use of a processor, an input;
determining a centric position of the input, wherein a vertical axis and a horizontal axis of a virtual coordinate plane extend through the centric position of the input such that an origin of the virtual coordinate plane is positioned within the centric position of the input; and
determining that the input is a circular gesture, wherein determining that the input is a circular gesture consists essentially of determining that the input intersects:
a positive point on a first axis extending through the origin;
a negative point on the first axis;
a positive point on a second axis extending through the origin; and
a negative point on the second axis.

10. The method of claim 9, wherein detecting the input comprises detecting a written gesture input.

11. The method of claim 9, wherein determining the centric position of the input comprises determining a centroid of the input.

12. The method of claim 9, further comprising determining whether the input intersects at least the positive point on the first axis, the negative point on the first axis, the positive point on the second axis, and the negative point on the second axis.

13. The method of claim 12, further comprising determining a plurality of data points positioned on the virtual coordinate plane, wherein each data point of the plurality of data points corresponds to a respective input data sample of the input.

14. The method of claim 13, wherein determining whether the input intersects at least the positive point on the first axis, the negative point on the first axis, the positive point on the second axis, and the negative point on the second axis comprises determining whether a line segment formed by connecting two data points of the plurality of data points passes through at least one of the first axis and the second axis, wherein the two data points correspond to two consecutive input data samples of the input.

15. The method of claim 12, further comprising down-sampling input data samples of the input to produce a reduced number of input data samples.

16. The method of claim 15, further comprising determining a plurality of data points on the virtual coordinate plane, wherein each data point of the plurality of data points corresponds to a respective input data sample of the reduced number of input data samples.

17. A program product comprising a computer readable storage medium that stores code executable by a processor, the executable code comprising code to perform:
detecting an input;
determining a centric position of the input, wherein a vertical axis and a horizontal axis of a virtual coordinate plane extend through the centric position of the input such that an origin of the virtual coordinate plane is positioned within the centric position of the input; and
determining that the input is a circular gesture, wherein determining that the input is a circular gesture consists essentially of determining that the input intersects:
a positive point on a first axis extending through the origin;
a negative point on the first axis;
a positive point on a second axis extending through the origin; and
a negative point on the second axis.

18. The program product of claim 17, wherein the code further comprises code to perform determining whether the input intersects at least the positive point on the first axis, the negative point on the first axis, the positive point on the second axis, and the negative point on the second axis.

19. The program product of claim 18, wherein the code further comprises code to perform determining a plurality of data points positioned on the virtual coordinate plane, wherein each data point of the plurality of data points corresponds to a respective input data sample of the input.

20. The program product of claim 19, wherein the code to perform determining whether the input intersects at least the positive point on the first axis, the negative point on the first axis, the positive point on the second axis, and the negative point on the second axis further comprises code to perform determining whether a line segment formed by connecting two data points of the plurality of data points passes through at least one of the first axis and the second axis, wherein the two data points correspond to two consecutive input data samples of the input.

* * * * *